United States Patent Office 3,544,564
Patented Dec. 1, 1970

3,544,564
IMIDAZOANTHRAQUINONE DYES
Hans Weidinger, Limburgerhof, Pfalz, and Manfred Eisert, Ludwigshafen (Rhine), Germany, assignors to Badische Anilin- & Soda-Fabrik Aktiengesellschaft, Ludwigshafen (Rhine), Germany
No Drawing. Filed Aug. 16, 1967, Ser. No. 660,938
Claims priority, application Germany, Aug. 19, 1966, 1,619,347
Int. Cl. C07d 49/36; C09b 23/14
U.S. Cl. 260—240        5 Claims

ABSTRACT OF THE DISCLOSURE

Anthraquinone derivatives which contain in $\alpha,\beta$-position an imidazole ring condensed onto the anthraquinone nucleus. These compounds can be prepared for example from 1,2-diaminoanthraquinone and acid halides; they are suitable as dyes.

---

For example yellow dyes of this class of compounds (which are prepared from 1,2-diaminoanthraquinone and benzoic acid derivatives) are described in U.S. patent application Ser. No. 439,470, (now abandoned), filed Mar. 12, 1965, by Hans Wiedinger and Gerhard Wellenreuther. These dyes have very good fastness properties but because the depth of color which can be achieved with these dyes in dyeing polyester fabric is unsatisfactory, there remains the problem of preparing yellow dyes which not only have the very good fastness properties of the dyes known from the said U.S. patent application Ser. No. 439,470 but also dye polyester material with great depth of color.

The dyes according to the present invention, which satisfy this requirement in a high degree, have the general formula:

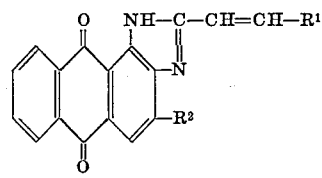

(I)

in which $R^1$ denotes one of the radicals phenyl, alkylphenyl, alkoxyphenyl, alkylalkoxyphenyl, nitrophenyl, halophenyl, dihalophenyl, naphthyl or thienyl, the alkyl groups and alkoxy groups containing one to four carbon atoms, and $R^2$ denotes a hydrogen atom, a chlorine atom or a bromine atom.

The radical $R^1$ may for example have the following meanings: phenyl, 4-methylphenyl, 3-methylphenyl, 2-methylphenyl, 4-isopropylphenyl, 4-methoxyphenyl, 3-methoxyphenyl, 2-methoxyphenyl, 4-chlorophenyl, 2,4-dichlorophenyl, 2-methoxy-4-methylphenyl, 2-methoxy-5-methylphenyl, 4-aminophenyl, 4-nitrophenyl, 2-hydroxyphenyl, 4-methylmercaptophenyl, naphthyl-(1) and thienyl-(2).

Anthraquinone dyes having the general formula:

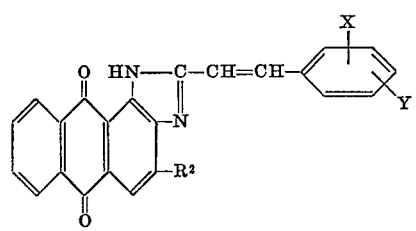

(II)

in which X denotes a hydrogen atom, a halogen atom or an alkyl radical having one to four atoms and Y denotes a hydrogen atom, a halogen atom, an alkyl radical having one to four carbon atoms or a nitro group and $R^2$ has the above meaning, one of special industrial interest.

The dyes having the Formulae I and II are new. They may be obtained for example by reacting 1,2-diaminoanthraquinone, 1,2-diamino-3-chloro-anthraquinone or 1,2-diamino-3-bromo-anthraquinone with an acid having the general formula: $R^1$—CH=CH—COOR ($R^1$ having the above meaning) or the corresponding acid halides, aldehydes, ortho esters or acetals, preferably in a solvent, at a temperature of up to 200° C.

For example the dye having the formula:

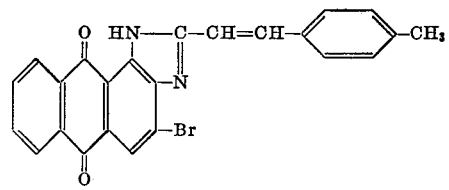

is obtained by reacting 1,2-diamino-3-bromoanthraquinone with 4-methylcinnamyl chloride at elevated temperature in nitrobenzene.

Polyester materials may for example be dyed with the new dyes. Examples of polyester materials are films, sheeting or textile material, such as fibers, filaments, threads, flock, woven fabrics and knitted fabrics of polyesters. Examples of polyesters are the products obtainable from terephthalic acid and ethylene glycol or $\alpha$-dimethylolcyclohexane.

Dye liquors which advantageously contain the dyes in finely divided form are used for dyeing. Polyester textile material may be dyed with these liquors for example at temperatures of from 95° to 100° C. at atmospheric pressure or at temperatures above 100° C. by the HT method or the Thermosol method. If full dyeings are to be obtained at temperatures above 100° C., it is advantageous to add carriers.

For printing polyester textile material, print pastes are used which contain the said dyes in finely divided form together with conventional thickeners and printing assistants. It is advantageous to add carriers to the print pastes. The mateiral is steamed and finished off as usual after it has been printed.

The dyeings and prints obtained with the dyes according to this invention have good fastness to light, washing, abrasion and heat and are greatly superior in depth of color to dyeings obtained with the dyes described in British patent specification No. 1,035,467. The shade of color ranges from greenish yellow to orange.

The invention is illustrated by the following examples. Parts mentioned in the examples are by weight unless stated otherwise. Parts by volume bear the same relation to parts by weight as the liter to the kilogram.

EXAMPLE 1

15.9 parts of 1,2-diamino-3-bromoanthraquinone, 16.6 parts of cinnamyl chloride and 160 parts by volume of nitrobenzene are heated for four hours at 150° C. and allowed to cool and then acetone is added. The residue is suction filtered and washed with acetone. The dried crude product of the dye (22.5 parts) is dissolved in pyridine and the dye is precipitated from this solution with methanol. 19 parts (88% of the theory) of the dye 2-$\beta$-styryl- 3-bromo-anthraquinone[1′,2′,5,4]-imidazole, having the formula:

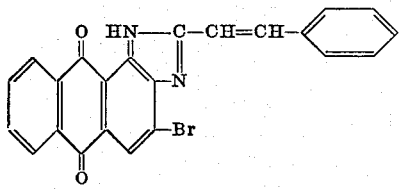

is obtained having a melting point of 240° C. It dyes polyester cloth yellow shades.

By using, instead of cinnamyl chloride in Example 1, the equivalent amount of an acid chloride having the formula ClOOC—CH=CH—R$^1$ and, instead of 1,2-diamino-3-bromoanthraquinone, a 1,2-diaminoanthraquinone, containing the radical R$^2$ in the 3-position dyes having the Formula I are obtained in which R$^1$ and R$^2$ have the meanings given in the following table:

| Example | R$^1$ | R$^2$ |
| --- | --- | --- |
| 2 | –C₆H₄–CH₃ | Br |
| 3 | –C₆H₄(CH₃) | Cl |
| 4 | –C₆H₄–CH(CH₃)–CH₃ | Cl |
| 5 | –C₆H₄–C(CH₃)₃ | H |
| 6 | –C₆H₄–OCH₃ | Cl |
| 7 | –C₆H₄(OCH₃) | Cl |
| 8 | –C₆H₃(CH₃)(OCH₃) | Br |
| 9 | –C₆H₄–NO₂ | Br |
| 10 | –C₆H₄–Cl | H |
| 11 | –C₆H₃(Cl)(Cl) | H |
| 12 | –naphthyl | Cl |
| 13 | –thienyl (HC=CH–C=CH–S) | Br |
| 14 | –C₆H₅ | H |
| 15 | –C₆H₄–Cl | Cl |

EXAMPLE 16

100 parts of polyethylene glycol terephthalate cloth is treated for ninety minutes at 135° C. in a dye liquor consisting of 5000 parts of water, 5 parts of a compound obtainable by reaction of 1 mole of sperm oil alcohol with 80 moles of ethylene oxide followed by sulfonation, and 1 part of the finely divided dye obtainable according to Example 1. A dyeing having great depth of color and good to very good fastness properties is obtained.

EXAMPLE 17

100 parts of polyethylene glycol terephthalate cloth is treated for ninety minutes at 95° to 100° C. in a dye liquor which consists of 5000 parts of water, 10 parts of finely divided o-phenylphenol, 2 parts of one of the finely divided dyes specified in Examples 1 to 15, 5 parts of a compound obtainable by reaction of 1 mole of sperm oil alcohol with 80 moles of ethylene oxide followed by sulfonation, and 1 part of glacial acetic acid.

The dyed cloth is washed with water and then treated for fifteen minutes at 85° C. in a liquor consisting of 5000 parts of water, 5 parts of sodium dithionite, 20 parts of caustic soda solution (38° Bé.) and 5 parts of a compound obtainable by reaction of 1 mole of oleylamine with 12 moles of ethylene oxide. It is then again washed with water. Dyeings analogous to that in Example 16 are obtained.

EXAMPLE 18

A polyethylene glycol terephthalate cloth is printed with a print paste consisting of 20 parts of diisobutyl phosphate, 15 parts of a mixture of the sodium salts of the disulfonimides of hydrocarbons having an average of ten carbon atoms in the molecule, 650 parts of crystal gum, 275 parts of water and 40 parts of the dye obtainable according to Example 15, and dried. The cloth is then steamed for thirty minutes under a steam pressure of 1.5 atmospheres gauge. A full yellow print having good fastness properties is obtained.

EXAMPLE 19

0.6 part of the dye specified in Example 1 is vatted in a mixture of 60 parts of water, 0.3 part of the sodium salt of the reaction product of β-naphthalenesulfonic acid and formaldehyde, 6 parts of caustic soda solution (38° Bé.) and 2.5 parts of sodium dithionite, for ten minutes at 60° C. Then 4 parts of glacial acetic acid and 30 parts of water are added.

100 parts of a polyethylene glycol terephthalate cloth is padded with this dye suspension at 50° C. (70% bad liquor pick-up) and treated for one minute at 220° C. without intermediate drying.

The dyed cloth is then rinsed while hot in a liquor consisting of 5000 parts of water, 20 parts of caustic soda solution (38° Bé.) and 15 parts of sodium dithionite. It is then soaped at the boil for fifteen minutes with a solution of 10 parts of a coconut oil alcohol sulfonate and 5 parts of sodium carbonate in 5000 parts of water rinsed while hot and dried. A full yellow dyeing having good fastness properties is obtained.

If the dye be present in finely divided form, the vatting described in the first paragraph of this example may be omitted.

We claim:
1. An anthraquinone dye having the general formula:

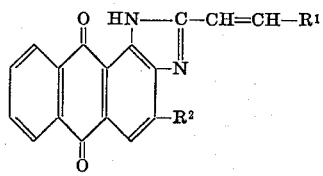

(I)

in which R$^1$ denotes one of the radicals: phenyl, alkylphenyl, alkoxyphenyl, alkylalkoxyphenyl, nitrophenyl, halophenyl, dihalophenyl, naphthyl or thienyl, the alkyl groups and alkoxy groups containing one to four carbon atoms, and R$^2$ denotes a hydrogen atom, a chlorine atom or a bromine atom.

2. The dye having the formula:
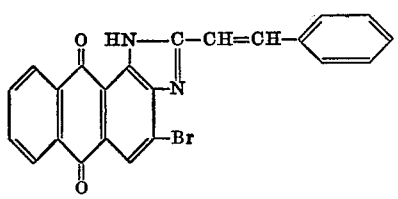
3. The dye having the formula:
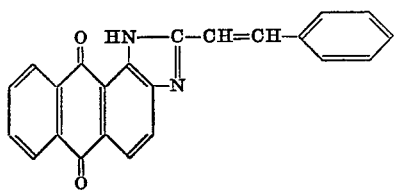
4. The dye having the formula:
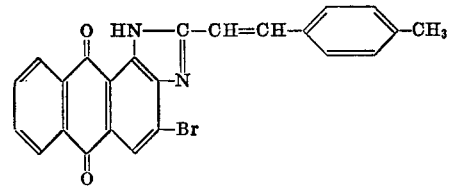
5. The dye having the formula:
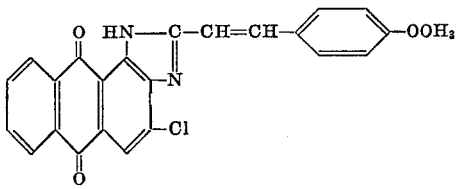
References Cited
Chemical Abstracts, vol. 55, col. 22, 829.
JOHN D. RANDOLPH, Primary Examiner
U.S. Cl. X.R.
8—39. 62. 179; 260—240.9

UNITED STATES PATENT OFFICE
CERTIFICATE OF CORRECTION

Patent No. 3,544,564                     Dated December 1, 1970

Inventor(s) Hans Weidinger et al

It is certified that error appears in the above-identified patent and that said Letters Patent are hereby corrected as shown below:

Column 1, formula I, that portion of the formula reading "NH" should read -- HN --.

Column 3, line 30, "Cl" should read -- Br --.

Column 6, Claim 5, that portion of the formula reading "OOH$_3$" should read -- OCH$_3$ --.

SIGNED AND
SEALED

FEB 23 1971

(SEAL)
Attest:

Edward M. Fletcher, Jr.                  WILLIAM E. SCHUYLER, JR.
Attesting Officer                        Commissioner of Patents